Patented Nov. 4, 1947

2,430,372

UNITED STATES PATENT OFFICE 2,430,372

PROCESS FOR DRYING POLYVINYL ALCOHOL

Gelu S. Stamatoff, Rutherford, N. J., assignor to E. I. du Pont de Nemours & Company, Wilmington, Del., a corporation of Delaware No Drawing. Application September 2, 1943, Serial No. 500,955

3 Claims. (Cl. 260—90)

This invention relates to the manufacture of polyvinyl alcohol and, more particularly, to a method of drying alcohol-wet polyvinyl alcohol.

Polyvinyl alcohol is normally made by reacting a polyvinyl ester, almost invariably polyvinyl acetate, with an alcohol, ordinarily ethanol or methanol, in the presence of an acidic or alkaline catalyst and the product which separates from the reaction batch in the form of fine particles is stabilized by neutralization of the residue of catalyst and is then dried for removal of residual solvent. The final product is "polyvinyl alcohol," actually, a hydrolyzed polyvinyl ester which usually has a residual content of polyvinyl ester that may run as high as 15% or so, by weight of the product, without seriously altering the essential alcohol characteristics of the compound.

In commercial operations, it is desirable that the drying be conducted at a high enough rate so that it proceeds rapidly and temperatures of the order of 100° C. are accordingly employed whenever that can be done without objectionable damage to the color or solubility of the polyvinyl alcohol. But deficiencies in stabilization, even though they may have no other objectionable consequence, do occasion such damage during simple air drying at these temperatures and, hence, it is frequently necessary to restrict the temperature of the drying to a lower level, e. g. 80° C., at which the drying consumes an uneconomically long time. In the drying of polyvinyl alcohol commercially, complete removal of volatiles is not sought; an adequately dried polyvinyl alcohol may contain as little as 3% or less of volatiles or as much as 7%, according to the requirements of its use.

The discoloration and impairment of solubility of the polyvinyl alcohol are perhaps caused by the action of residual catalyst under the influence of the heat of drying because it is observed that, in general, the extent of the discoloration and impairment of solubility occurring during drying is minimized by careful neutralization of residual catalyst before the drying. Regardless of this explanation, however, it is a fact that a polyvinyl alcohol which is in other respects satisfactory, may be unacceptable by reason of a discoloration or impairment of solubility which has taken place during its drying, and also that such deterioration has not heretofore been avoidable by modification of the technique of drying, except by reducing the temperature of the drying so drastically as to prolong excessively the time required to produce a satisfactorily dry product.

An object of the present invention is to provide a method of drying alcohol-wet polyvinyl alcohol which will be rapid enough to be economical on a commercial scale but which will result in a minimum of discoloration of the polyvinyl alcohol and of impairment of its solubility in water. A further object is to provide such a process which will give satisfactory results even when applied to a polyvinyl alcohol that has not previously been thoroughly enough stabilized to withstand drying without pronounced deterioration by methods of drying heretofore known other than the obviously uneconomical method of using a low temperature for the drying. Other objects will be apparent from the description of the invention given hereinafter.

The above objects are accomplished according to the present invention by reacting polyvinyl acetate with a lower saturated aliphatic monohydric alcohol in the presence of an acidic or alkaline catalyst, separating the polyvinyl alcohol thus formed and substantially neutralizing any residue of catalyst associated therewith, and then subjecting the polyvinyl alcohol to an atmosphere of moist air at an elevated temperature, normally between 90° C. and 115° C. More specifically, the moist air should have a relative humidity of at least 8% and, preferably, between 12% and 15%.

It has been discovered that unexpectedly the impairment of color and solubility of polyvinyl alcohol during its drying can be prevented or minimized by maintaining a content of moisture in the atmosphere with which the polyvinyl alcohol is in contact during its drying.

It is preferred to carry out the drying of the alcohol-wet polyvinyl alcohol, according to the present invention, by suitably spreading the polyvinyl alcohol out on trays or the like in a vacuum oven operated at 100° C.–110° C. under a fairly good vacuum, about 15 to 25 inches of mercury, and provided with a source of water vapor in the form of a reservoir of water either within the oven and at its temperature or outside the oven and separately heated to cause evolution of water vapor which is carried into the oven through a duct. The drying may be carried out, however, merely by subjecting the polyvinyl alcohol at atmospheric pressure to a current of air of the desired temperature and relative humidity.

Another method of carrying out the drying is to have the polyvinyl alcohol itself moist with water when it enters the drier, and to rely upon this water to maintain moisture in the atmosphere in contact with the polyvinyl alcohol as it dries. This method may be followed with advantage in drying polyvinyl alcohol which has been stabilized by the method disclosed in my copending application Serial No. 419,319, filed November 15, 1941, now U. S. Patent 2,356,282. In the method disclosed in that patent a stabilizing treatment of the polyvinyl alcohol with aqueous alcohol may leave in and upon the polyvinyl alcohol going to the drier a content of water sufficient to meet the requirements of the present invention. It will be evident, however, that a limited content of moisture in and upon the polyvinyl alcohol introduced into the drier can be counted upon to maintain the necessary humidity in the atmosphere for only a limited time and that, if the material is left in the drier after this moisture has been completely volatilized and withdrawn, a further stay of the polyvinyl alcohol in the drier without benefit of the moisture will begin to bring about the deteriorating effects upon color and solubility which the present invention is designed to exclude. Therefore, it is necessary in using this embodiment of the invention to avoid leaving the polyvinyl alcohol exposed to the heat of the drier after the moisture in the atmosphere has fallen below the level at which it is protective to color and stability, namely, at least about 8% relative humidity.

Specific embodiments of the invention are illustrated in the following examples wherein all proportions are given by weight unless otherwise noted.

Example I

A batch of polyvinyl alcohol precipitated from methanol and carrying approximately 58% of its own weight of methanol is divided into three portions which are treated as follows:

(A) This portion is dried to a volatiles content of 0.6% in a vacuum oven at 80° C. and under a vacuum of 20 inches of mercury. This required 4.5 hours but the color of the polyvinyl alcohol was not impaired nor was its solubility in water. Its viscosity after the drying treatment was 27.4 centipoises as determined by a standard Ostwald viscosimeter using a 4% solution of the polyvinyl alcohol in water at 20° C. All other viscosities noted hereinafter were determined in the same manner.

(B) This portion is dried to a volatiles content of 0.2% in a vacuum oven at 110° C. and under a vacuum of 20 inches of mercury. This required only 2 hours but the resulting polyvinyl alcohol product was discolored yellow, its solubility in water was imperfect, and its viscosity was 38.0 centipoises.

(C) This portion is dried, in accordance with the present invention, in a vacuum oven containing an open vessel of water. The temperature of the oven was maintained at 110° C. with a vacuum of 20 inches of mercury. After drying for 2 hours the polyvinyl alcohol reached a volatiles content of 0.4% and the relative humidity maintained in the oven was about 13%. The dried polyvinyl alcohol was equal in color to that of (A), it is completely soluble in water and has a viscosity of 27.4 centipoises.

Example II 100 parts of polyvinyl alcohol wet with 40 parts of methanol were suspended and stirred in a mixture of 400 parts of methanol and 10 parts of water. To this mixture was added sufficient ammonium hydroxide to establish slight alkalinity. The liquor was then drained away and the polyvinyl alcohol was stirred continuously in a heated vessel under a vacuum of 20 inches of mercury and with access of a small jet of steam which maintained a relative humidity somewhat above 8% in the vessel. After 2 hours of this treatment at 95° C. to 100° C. the content of volatiles of the polyvinyl alcohol was reduced to 2%. Its color was good and its viscosity normal, both being equal to those of a duplicate lot dried to the same point at 80° C. in air without moisture.

Example III

A polyvinyl alcohol obtained by reacting polyvinyl acetate with alcohol in the presence of an acidic catalyst was stabilized by neutralization of its acidity with sodium hydroxide and was then dried in an oven maintained at 100° C. and under vacuum. The oven, throughout the drying, was in communication with the atmosphere above a pan of water maintained at 60° C. with the result that the relative humidity of the atmosphere in the oven was in excess of 8%. The resulting dried polyvinyl alcohol had good color and normal viscosity.

Example IV

Polyvinyl alcohol wet with methanol was placed in a flask fed with an agitator. The flask was heated at 114° C.–117° C. for 5 hours with an inflow of air which had been bubbled through water at approximately 55° C. The relative humidity in the flask was thus maintained at 8.5% at 115° C. The resulting dried polyvinyl alcohol was white and completely soluble in water.

Example V

Polyvinyl alcohol wet with methanol was placed in a vacuum kettle drier equipped with a hot water jacket and an anchor agitator. An intake pipe permitted the entry of water vapor from a flask of boiling water. Water at about 98° C. was circulated through the jacket, the agitator was kept in motion, and a vacuum of 24 inches of mercury was obtained. In this manner the relative humidity in the vessel was kept at about 26%. At the end of one hour the content of volatiles in the polyvinyl alcohol had been reduced to 1.3% and treatment for a second hour reduced it only to 1.2% which indicated approximate equilibrium with the moisture content of the atmosphere within the vessel. The resulting dried polyvinyl alcohol was white and completely soluble in alcohol.

It will be understood that the above examples are merely illustrative and the present invention broadly comprises the drying of alcohol-wet polyvinyl alcohol in an atmosphere of moist air at an elevated temperature.

The relative humidity of the air may be varied considerably in carrying out the drying but to be effective it should not be substantially less than 8% and, preferably, should be around 12% or slightly higher. In so far as protecting the polyvinyl alcohol from the deteriorating effect of drying at high temperature is concerned, there is no upper limit to the relative humidity of the air up to 100% but, as a practical matter, there is ordinarily nothing to be gained by using air of greater than 15% relative humidity.

Since the purpose of the invention is to speed up the drying of polyvinyl alcohol without any deteriorating effect on it, it would be pointless not to use a temperature in excess of 80° C. which temperature of 80° C. can be used without danger in ordinary air drying of polyvinyl alcohol. To gain any appreciable practical benefit from this invention, the drying temperature should be at least 90° C. and a temperature of 100° C. or above is preferred. A drying temperature appreciably above 115° C. is usually not practical although it can be used.

The use of a vacuum in the drying chamber is not necessary but it manifestly will expedite the drying. As heretofore indicated, a vacuum of 15 to 25 inches of mercury has been found satisfactory and practical.

The process of this invention accomplishes the drying of particles of polyvinyl alcohol without impairment of its color or of its solubility in water, or with a minimum of such impairment, and is thus adapted to dry, without impairment, a polyvinyl alcohol which, having been imperfectly stabilized, is subject to change in color and loss of solubility through being dried by practical and economical techniques heretofore known.

While the present invention is particularly effective in drying polyvinyl alcohol where stabilization of the polyvinyl alcohol has not been thorough, and especially where the hydrolysis of the polyvinyl ester to form the polyvinyl alcohol has been in the presence of an acidic catalyst, because such polyvinyl alcohol shows the greatest tendency to serious impairment through ordinary air drying at relatively high temperatures, the present invention is applicable to drying of alcohol-wet polyvinyl alcohol in general. Where the polyvinyl alcohol has been carefully stabilized by the method disclosed in said U. S. Patent 2,356,282, it is a fact that any appreciable impairment of its color or solubility in water ordinarily would not occur with careful conventional air drying, nevertheless, even with respect to such polyvinyl alcohol it is an advantage to use the present method of drying as a simple and inexpensive precaution.

As many apparently widely different embodiments of this invention may be made without departing from the spirit and scope thereof, it is to be understood that the invention is not limited to the specific embodiments thereof except as defined in the appended claims.

I claim:

1. Process of drying alcohol-wet polyvinyl alcohol which comprises subjecting said polyvinyl alcohol to an atmosphere of moist air at a temperature of 90° C.–115° C., said moist air having a relative humidity of at least 8%, until the volatiles content of the polyvinyl alcohol has been reduced below 7%.

2. Process of drying alcohol-wet polyvinyl alcohol which comprises subjecting said polyvinyl alcohol to an atmosphere of moist air at a temperature of 90° C.–115° C. under reduced pressure, said moist air having a relative humidity of 12%–15%, until the volatiles content of the polyvinyl alcohol has been reduced below 7%.

3. Process of drying alcohol-wet polyvinyl alcohol which comprises subjecting said polyvinyl alcohol to an atmosphere of moist air at a temperature of 90° C.–115° C. under a vacuum of 15 to 25 inches of mercury, said moist air having a relative humidity of 12%–15%, until the volatiles content of the polyvinyl alcohol has been reduced below 7%.

GELU S. STAMATOFF.

REFERENCES CITED

The following references are of record in the file of this patent:

UNITED STATES PATENTS

| Number | Name | Date |
| --- | --- | --- |
| 1,897,856 | Noller | Feb. 14, 1933 |
| 2,227,997 | Berg | Jan. 7, 1941 |
| 2,302,817 | Toland | Nov. 24, 1942 |
| 1,218,261 | Hunter | Mar. 6, 1917 |
| 1,958,110 | Newton | May 8, 1934 |

OTHER REFERENCES

Chemical Engineer's Handbook, J. H. Perry (McGraw-Hill) 2nd ed., 1941, pages 1488 and 1513.